United States Patent
Lin et al.

(10) Patent No.: US 11,964,409 B2
(45) Date of Patent: Apr. 23, 2024

(54) MULTI-SHOT MOULDING PART STRUCTURE

(71) Applicants: Inventec (Pudong) Technology Corp., Shanghai (CN); Inventec Corporation, Taipei (TW)

(72) Inventors: Wen-Ching Lin, Taipei (TW); Ting-Yu Wang, Taipei (TW); Fa-Chih Ke, Taipei (TW); Yu-Ling Lin, Taipei (TW); Wen-Hsiang Chen, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 374 days.

(21) Appl. No.: 17/463,524

(22) Filed: Aug. 31, 2021

(65) Prior Publication Data
US 2022/0388202 A1   Dec. 8, 2022

(30) Foreign Application Priority Data
Jun. 7, 2021 (CN) .......................... 202110633648.2

(51) Int. Cl.
*B29C 49/22* (2006.01)
*B29B 11/14* (2006.01)
*B29K 67/00* (2006.01)

(52) U.S. Cl.
CPC ............ *B29B 11/14* (2013.01); *B29C 49/22* (2013.01); *B29C 2949/3012* (2022.05); *B29C 2949/3016* (2022.05); *B29C 2949/302* (2022.05); *B29C 2949/3028* (2022.05); *B29K 2067/00* (2013.01); *Y10T 428/19* (2015.01); *Y10T 428/195* (2015.01)

(58) Field of Classification Search
None
See application file for complete search history.

(56) References Cited

U.S. PATENT DOCUMENTS 6,540,855 B1 * 4/2003 Holmberg ............. B29C 66/114
156/292

* cited by examiner

*Primary Examiner* — Alexander S Thomas
(74) *Attorney, Agent, or Firm* — Winston Hsu

(57) ABSTRACT

A multi-shot moulding part structure includes a first structural part, an ink decoration layer, and a second structural part. The first structural part has a first area surface, a second area surface, and a joining surface located on the second area surface. The joining surface is non-parallel to the second area surface. The ink decoration layer is spread on the first area surface and the second area surface, but not on the joining surface. The second structural part is combined with the first structural part and covers the second area surface. The second structural part touches the joining surface. By the second structural part touching the joining surface of the first structural part that is not coated with the ink decoration layer, the structural bonding strength between the first structural part and the second structural part is enhanced.

8 Claims, 6 Drawing Sheets

MULTI-SHOT MOULDING PART STRUCTURE

BACKGROUND OF THE INVENTION

1. Field of the Invention

The present invention relates to a multi-shot moulding part structure, and more particularly to a multi-shot moulding part structure having an ink decoration layer.

2. Description of the Prior Art

In-Mold Decoration by Roller (IMR) is mainly used to add a film printed with ink in a plastic injection process, and transfer the ink on the film to the injection molded product after molding. This process allows the finished product to have the appearance effect after treatment such as spraying paint, electroplating, printing, etc. However, when the IMR is used in two-color (material) injection processes, the transferred ink will reduce the bonding strength between the first-shot injection part and the second-shot injection part. This is because when the first shot is completed, the IMR ink is transferred to the first-shot injection part, and when the second shot is completed, the transferred ink is between the first-shot injection part and the first-shot injection part. As a result, the first-shot injection part and the second-shot injection part are not well combined and easily separated from each other. This situation is especially serious when using soft polymer materials in the second shot. Besides, if the printing area on the IMR transfer film is precisely aligned during the first shot, the transferred ink will easily accumulate at the junction between the first-shot injection part and the second-shot injection part. It causes another poor appearance problem, and the accumulated ink is not easy to remove.

SUMMARY OF THE INVENTION

An objective of the invention is to provide a multi-shot moulding part structure, which uses a joining surface that is not coated with an ink decoration layer to increase the bonding strength between structural parts formed at different stages.

A multi-shot moulding part structure according to the invention includes a first structural part, an ink decoration layer, and a second structural part. The first structural part has a first area surface, a second area surface, and a joining surface on the second area surface. The joining surface and the second area surface are non-parallel. The ink decoration layer is spread on the first area surface and the second area surface and not on the joining surface. The second structural part is combined with the first structural part and covers the second area surface. The second structural part touches the joining surface. Therefore, by the second structural part touching the joining surface of the first structural part that is not coated with the ink decoration layer, the structural bonding strength between the first structural part and the second structural part is increased, thereby solving the problem in the prior art that because of the presence of the transferred ink between the first-shot injection part and the second-shot injection part, the bonding strength of the injection parts is reduced and the injection parts are easily separated from each other.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
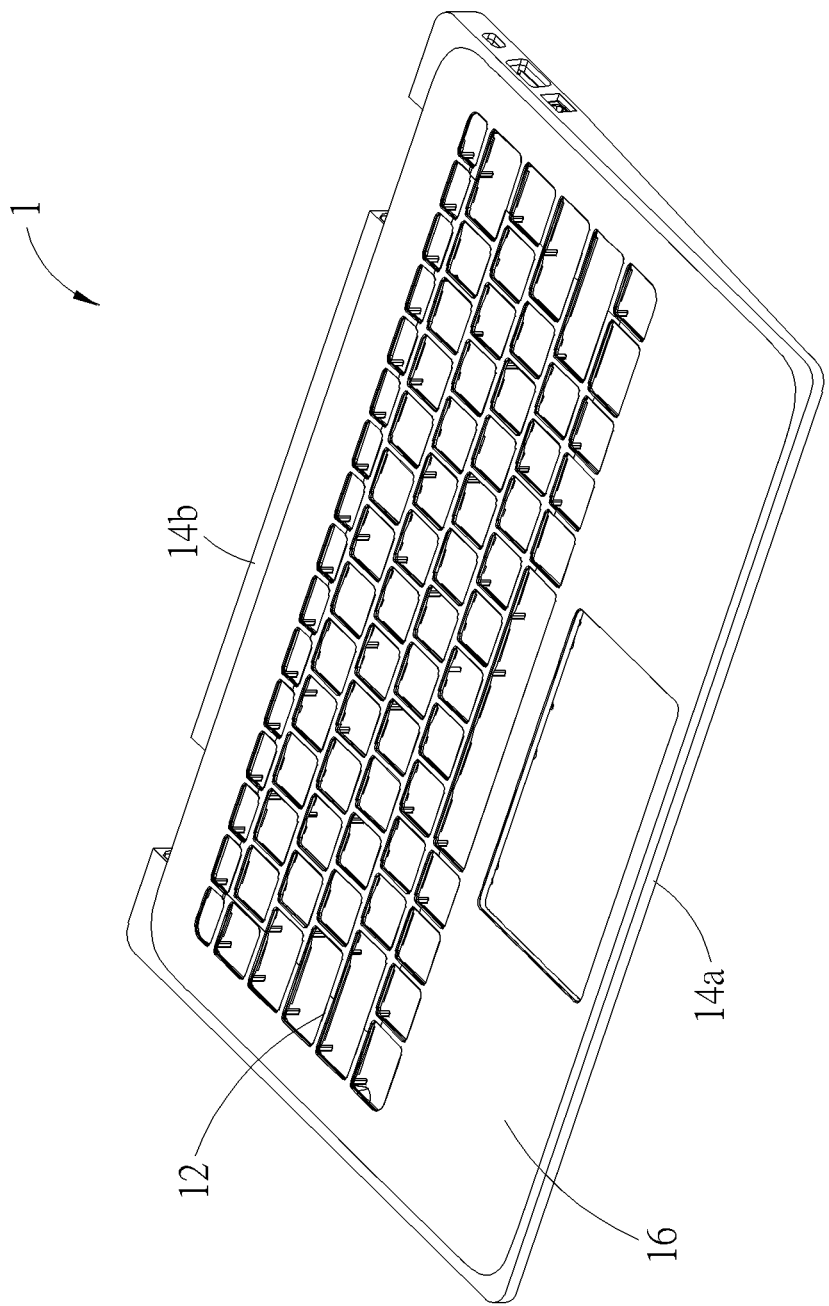
FIG. 1 is a schematic diagram illustrating a multi-shot moulding part structure according to an embodiment.
Figure 2:
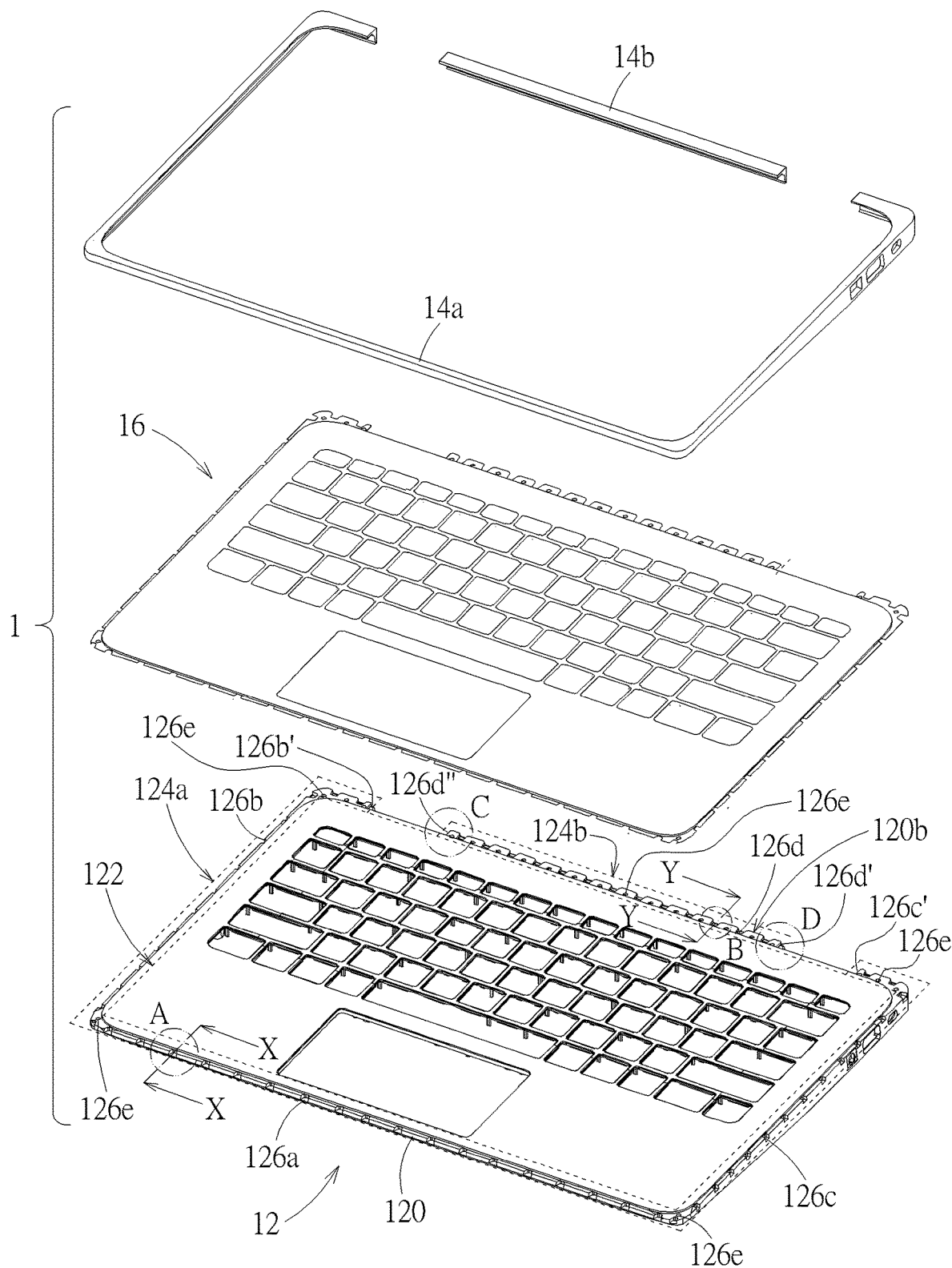
FIG. 2 is an exploded view of the multi-shot moulding part structure in FIG. 1.

Please refer to FIG. 1 and FIG. 2. A multi-shot moulding part structure 1 according to an embodiment includes a first structural part 12, two second structural parts 14a and 14b, and an ink decoration layer 16 (shown by a single-layer structure in FIG. 2 for drawing simplification). The ink decoration layer 16 is spread on the first structural part 12 and can be used as an appearance decoration of the first structural member 12. The second structural parts 14a and 14b are combined with the first structural part 12 and cover at least part of the ink decoration layer 16; that is, the ink decoration layer 16 will be located between first structural part 12 and the second structural parts 14a and 14b. The first structural part 12 increases the surface that is not coated by the ink decoration layer 16 through a special structural design, so that the second structural parts 14a and 14b can directly touch the surface, increasing the bonding strength between the first structural part 12 and the second structural parts 14a and 14b.

In the embodiment, the first structural part 12 has a first area surface 122 and two second area surfaces 124a and 124b (all are respectively indicated by a dashed frame in FIG. 2). Therein, the second area surface 124a is roughly U-shaped, adjacent to and surrounding the first area surface 122; the second area surface 124b is straight. The second area surfaces 124a and 124b as a whole roughly enclose the first area surface 122. The first structural part 12 includes a plurality of recessed structures 126a~d on the second area surfaces 124a and 124b (and around the first area surface 122). The ink decoration layer 16 is spread on the whole first area surface 122 and the whole second area surfaces 124a and 124b; however, it is not limited thereto in practice. For example, the ink decoration layer 16 may be spread on part of the first area surface 122 and part of the second area surfaces 124a and 124b. Furthermore, in practice, the ink decoration layer 16 may include ink only and is spread on the required portions of the first area surface 122 and on part of the second area surfaces 124a and 124b (e.g. transferred through IMR technology). The entire ink decoration layer 16 is not limited to a continuous structure, but may include several separate ink coating areas.

Figure 3:
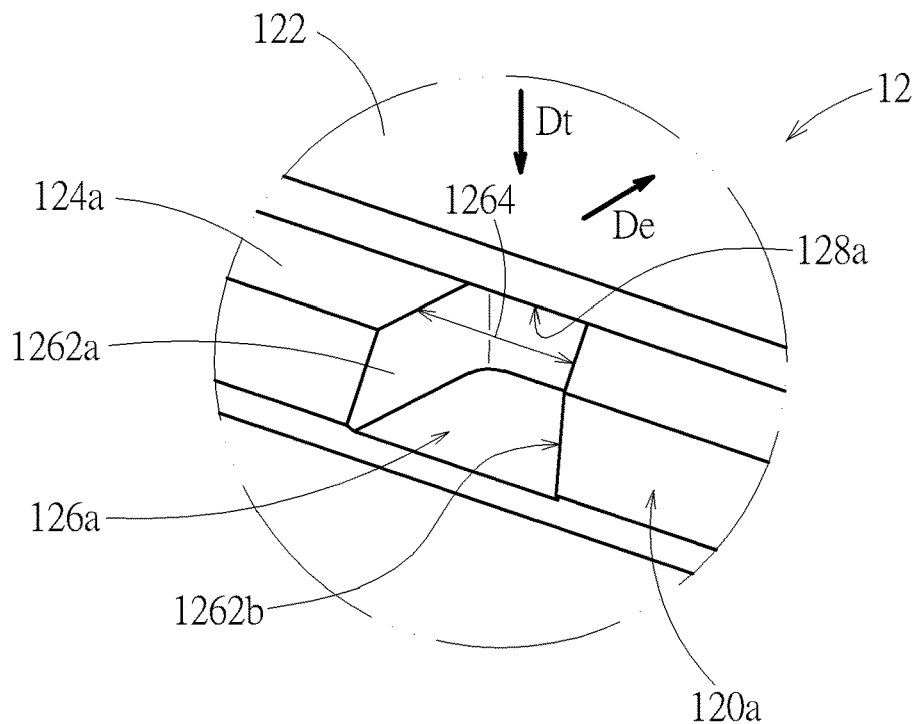
FIG. 3 is an enlarged view of the first structural part at the circle A in FIG. 2.
Figure 4:
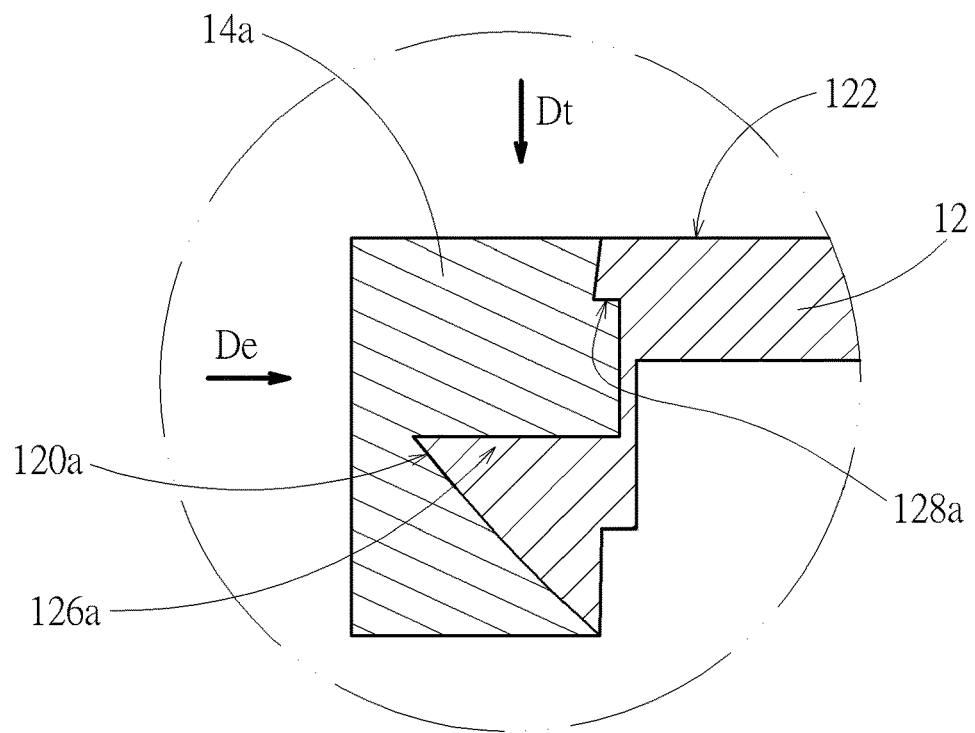
FIG. 4 is a sectional view of the multi-shot moulding part structure in FIG. 1, of which the position of the cutting plane is shown by the line X-X in FIG. 2.

Each recessed structure 126a~d includes at least one joining surface. The ink decoration layer 16 is not spread on these joining surfaces, so that the second structural parts 14a and 14b can directly touch these joining surfaces. As shown by FIG. 2 to FIG. 4, the plurality of recessed structures 126a located on the lower portion of the second area surface 124a are arranged parallel to the direction in which the lower portion extends and are formed on an outer edge 120a of the first structural part 12. The recessed structure 126a is a recess (or a blind hole), of which two side surfaces are used as joining surfaces 1262a and 1262b and are perpendicular to the second area surface 124a. The ink decoration layer 16 is spread on the first area surface 122 and the second area surface 124a, but not on the joining surfaces 1262a and 1262b. In practice, it may be achieved through IMR technology; therein, the transfer direction Dt (indicated by an arrow in FIG. 4) is substantially perpendicular to the second area surface 124a, so that during the ink transfer, the ink does not easily adhere to the joining surfaces 1262a and 1262b. The second structural part 14a is combined with the first structural part 12 and covers the second area surface 124a, and directly touches the joining surfaces 1262a and 1262b. In practice, the combination of the second structural part 14a and the first structural part 12 may be achieved by directly forming the second structural part 14a on the first structural part 12 through injection molding. Thereby, even when the ink decoration layer 16 is not well integrated with the first structural part 12 or the second structural part 14a, the second structural part 14a can still be effectively combined with the first structural part 12 through the joining surfaces 1262a and 1262b.

Figure 5:
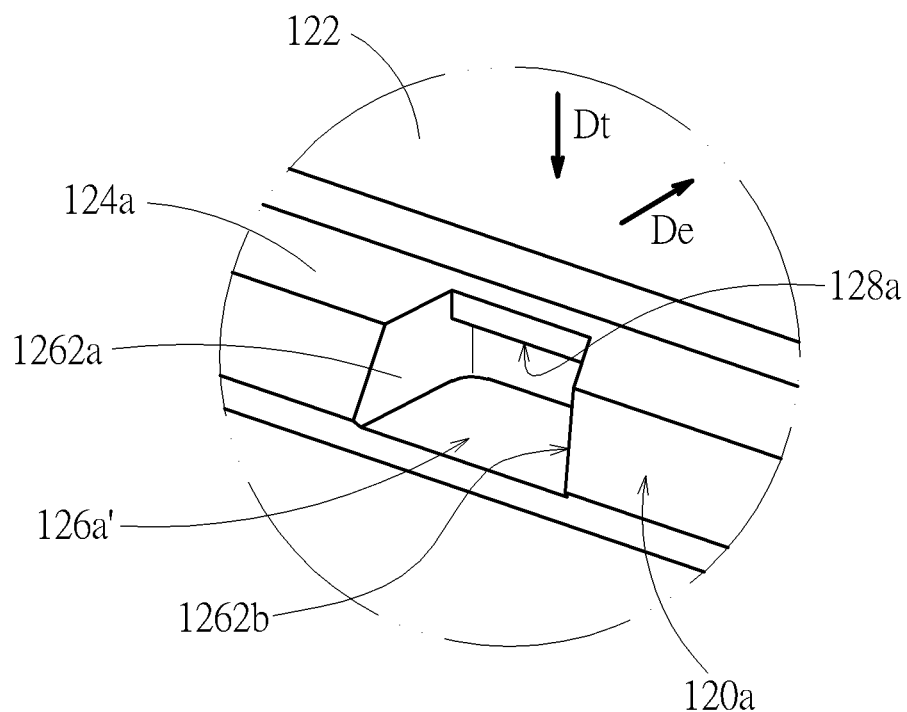
FIG. 5 is a schematic diagram illustrating a variant of the recessed structure in FIG. 3.

Furthermore, in the embodiment, the first area surface 122 and the second area surface 124a are two surfaces of different heights in a step structure. The first structural part 12 has a bottom surface 128a opposite to the first area surface 122. The recessed structure 126a adjoins the bottom surface 128a. When forming the second structural part 14a on the first structural part 12, the second structural part 14a will directly touch the bottom surface 128a. This structural configuration can increase the bonding strength between the first structural part 12 and the second structural part 14a (especially in the direction perpendicular to the second area surface 124a). In practice, the bottom surface 128a may be opposite to the second area surface 124a. For example, the recessed structure 126a' shown by FIG. 5 can also be firmly combined with the second structural part 14a.

Figure 6:
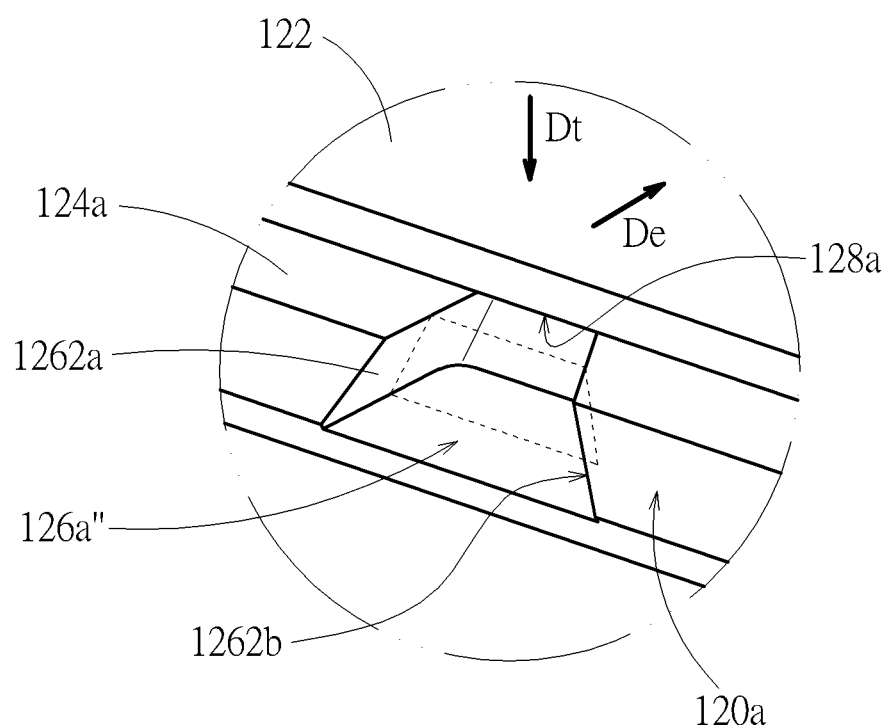
FIG. 6 is a schematic diagram illustrating another variant of the recessed structure in FIG. 3.

Furthermore, as shown by FIG. 3, in the embodiment, the recessed structure 126a is located at the outer edge 120a and has openings in a direction parallel to and perpendicular to the second area surface 124a. The recessed structure 126a has a decreasing width 1264 in an extension direction De. The extension direction De points from the outer edge 120a to the inner side of the first structural part 12 and is parallel to the second area surface 124a. This structural configuration is conducive to the design of the forming mold of the first structural part 12 (for example, the forming mold may adopt IMR technology, and can simultaneously realize the forming of the first structural part 12 and the transfer of the ink decoration layer 16). In addition, in practice, the joining surfaces 1262a and 1262b are not parallel to the second area surface 124a, which in principle can prevent or reduce the ink from coating on the joining surfaces 1262a and 1262b. In a variant, as shown by FIG. 6, the recessed structure 126a" has a trapezoidal cross section in the extension direction De (i.e. the cross-sectional profile perpendicular to the extension direction De is a trapezoidal, shown by dashed lines in the figure), which can increase the bonding strength between the first structural part 12 and the second structural part 14a (especially in the direction perpendicular to the second area surface 124a). In addition, in the embodiment, the plurality of recessed structures 126b and 126c located on both sides of the second area surface 124a are the same as the recessed structure 126a, and will not be described in detail.

Figure 7:
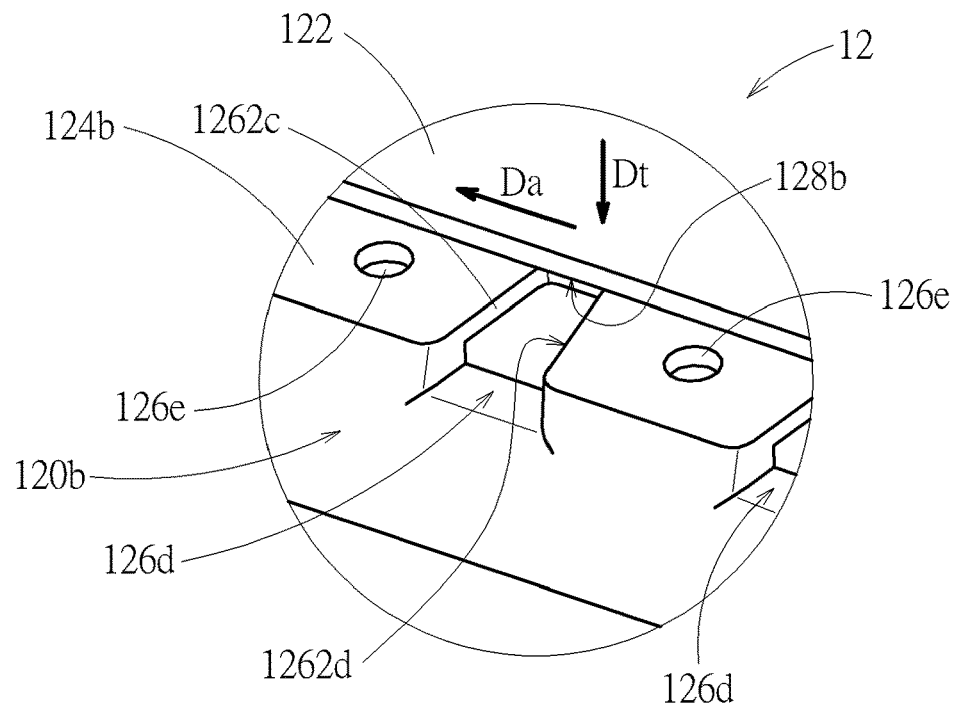
FIG. 7 is an enlarged view of the first structural part at the circle B in FIG. 2 from another view point.
Figure 8:
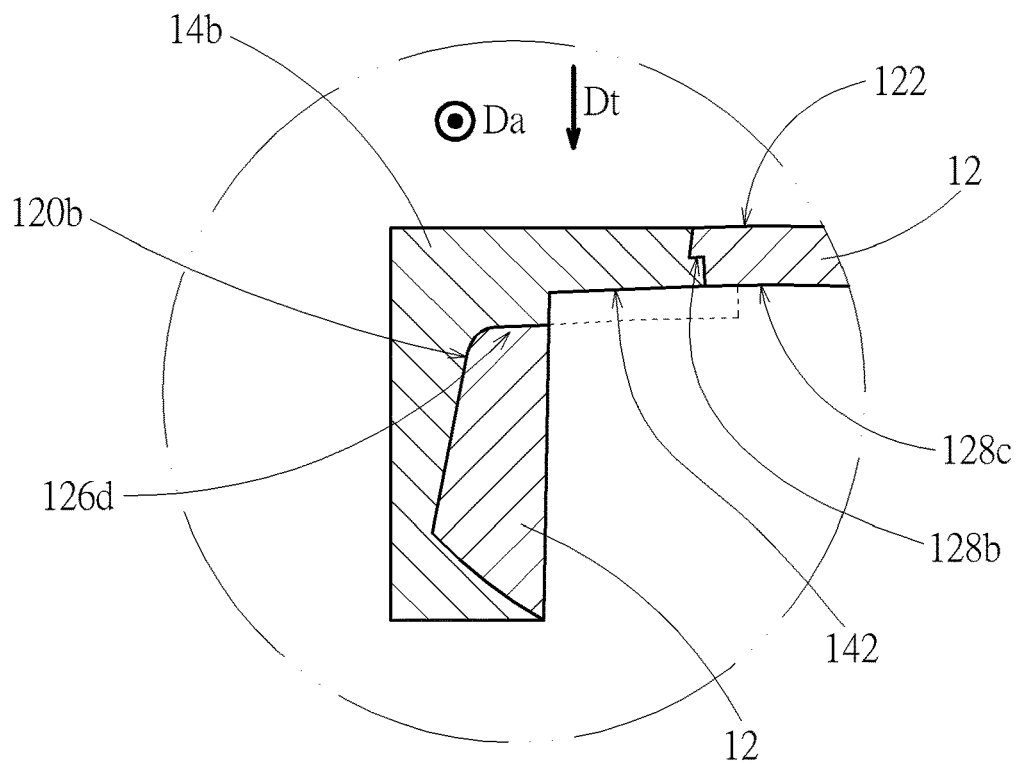
FIG. 8 is another sectional view of the multi-shot moulding part structure in FIG. 1, of which the position of the cutting plane is shown by the line Y-Y in FIG. 2.

Furthermore, as shown by FIG. 2, FIG. 7 and FIG. 8, the plurality of recessed structures 126d located on the second area surface 124b are arranged parallel to the direction in which the second area surface 124b extends and are formed on another outer edge 120b of the first structural part 12. The first structural part 12 has a bottom surface 128b opposite to the first area surface 124a. The recessed structure 126d is a through hole (or a recess structure that passes through the first structural part 12) adjoining the bottom surface 128b. The ink decoration layer 16 is also spread on the second area surface 124b but not on joining surfaces 1262c and 1262d of the recessed structure 126d and the bottom surface 128b. In structural logic, the recessed structure 126d is similar to the recessed structure 126a, but the recessed structure 126d has an opening at the bottom, so that when forming the second structural part 14b on the first structural part 12, the molding material can flow more easily to contact the bottom surface 128b. Thereby, even when the ink decoration layer 16 is not well integrated with the first structural part 12 or the second structural part 14b, the second structural part 14b can still be effectively combined with the first structural part 12 through the joining surfaces 1262c and 1262d. Besides, the second structural part 14b is partially located on the bottom surface 128b. This structural configuration can increase the bonding strength between the first structural part 12 and the second structural part 14b (especially in the direction perpendicular to the second area surface 124b). Furthermore, the foregoing descriptions of the variants of the recessed structures 126a' and 126a" are also applicable here, and will not be repeated in addition. In practice, the recessed structure 126d may also adopt the recessed structure 126a structure, and vice versa.

In addition, in the embodiment, a bottom surface 142 of the second structural part 14b exposed under the first structural part 12 and an exposed bottom surface 128c of the first structural part 12 are coplanar (or the two are continuously and smoothly connected). In practice, if the structural design permits (for example, the second structural part 14b will not interfere with other structures or devices using the multi-shot moulding part structure 1), the second structural part 14b may further protrude downward to cover part of the bottom surface 128c (indicated by dashed lines in FIG. 8), so as to increase the bonding strength between the first structural part 12 and the second structural part 14b (especially in the direction perpendicular to the second area surface 124b).

Figure 9:
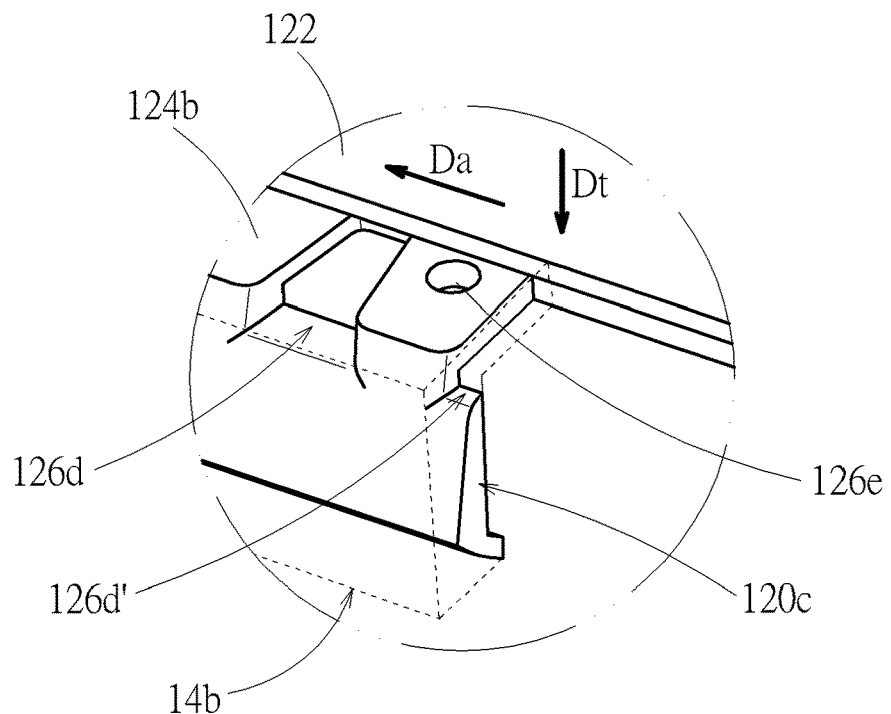
FIG. 9 is an enlarged view of the first structural part at the circle C in FIG. 2 from another view point.
Figure 10:
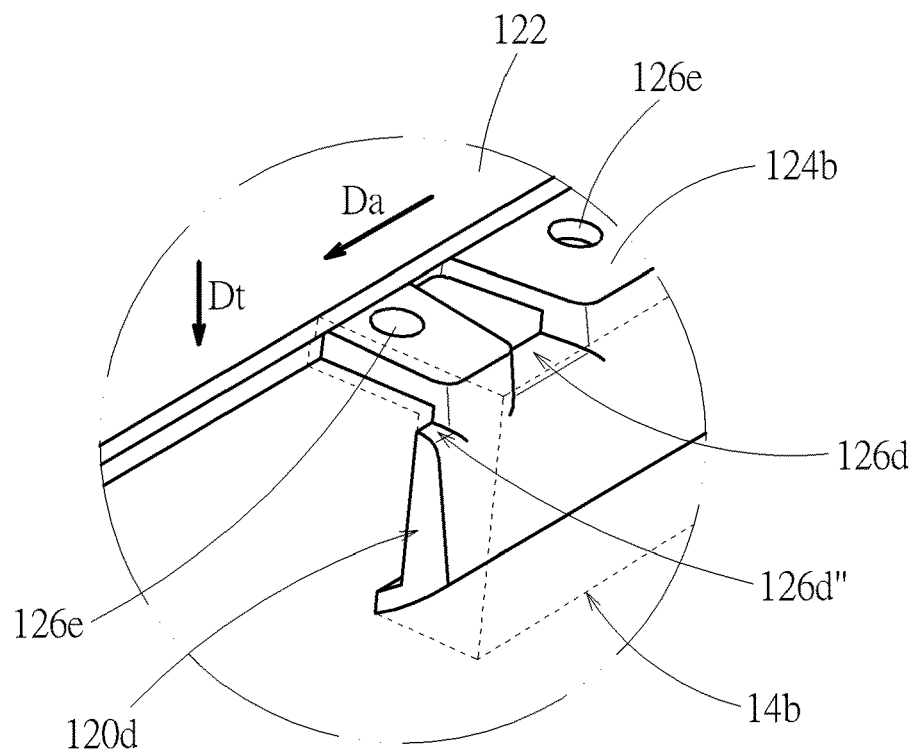
FIG. 10 is an enlarged view of the first structural part at the circle D in FIG. 2 from another view point.

Furthermore, as shown by FIG. 2, FIG. 9 and FIG. 10, in the embodiment, the first recessed structure 126d' or the last recessed structure 126d" of the plurality of the recessed structures 126d in its arrangement direction Da (indicated by an arrow in the figures) are located at outer edges 120c and 120d of the first structural part in the arrangement direction Da respectively. For the convenience of description, in FIG. 9 and FIG. 10, the outline of the second structural part 14b is shown in dashed lines. Because the recessed structure 126d' and 126d" are located at the outer edge 120c and 120d, they are slightly different from the recessed structure 126d.

In structural logic, the recessed structure 126d' and 126d" are roughly equivalent to half of the recessed structure 126d. This structural configuration allows the second structural part 14b to be structurally combined with both ends (i.e. the outer edges 120c and 120d) of the first structural part 12 in the arrangement direction Da, which can prevent the second structural part 14b from being separated from the two ends of the first structural part 12 in the arrangement direction Da and increase the stability of the structural combination of the second structural part 14b and the first structural part 12. Furthermore, in the embodiment, the first structural part 12 has recessed structures 126b' and 126c' similar to the recessed structure 126d' corresponding to the free ends of the second structural part 14a. This structural configuration also has a similar effect, which will not be repeated in addition.

In addition, as shown by FIG. 2, in the embodiment, the first structural part 12 includes a plurality of recessed structures 126e with circular holes on the second area surfaces 124a and 124b. The hole wall of the recessed structure 126e can also be used as a joining surface, so that the second structural parts 14a and 14b also directly touch the hole walls, which can increase the bonding strength of the second structural parts 14a and 14b and the first structural part 12, which will not be repeated. Furthermore, the recessed structure 126e may also adopt a structural design similar to the recessed structures 126a and 126d, but does not form an opening at the outer edges 120a and 120b.

In the embodiment, the multi-shot moulding part structure 1 is an upper casing of a notebook computer base, but it is not limited thereto in practice. For example, some handheld devices also use two-material injection parts. Furthermore, the first structural part 12 and the second structural parts 14a and 14b are different in material. For example, the first structural part 12 is hard plastic, and the second structural parts 14a and 14b are soft rubber. However, it is not limited thereto in practice. For example, they use the same material or the same kind of material but different colors. Furthermore, in the embodiment, the multi-shot moulding part structure 1 has two second structural parts 14a and 14b, which as a whole roughly enclose the first area surface 122. In practice, the second structural parts 14a and 14b may be achieved by a single structural part; that is, it completely surrounds the first structural part 12. In addition, in the embodiment, the multi-shot moulding part structure 1 is illustrated by the structural configuration with an ink layer between two structural parts; however, it is not limited thereto in practice. For example, in a structural configuration in which there are more layered structural parts and an ink layer is disposed between adjacent two layered structural parts, the structural combination of the first structural part 12 and the second structural parts 14a and 14b can be applied the combination between adjacent layered structural parts herein, which will not repeated in addition. Furthermore, in practice, the multi-shot moulding part structure 1 is quite suitable for being formed by a multiple moulding mold using IMR technology. Through the combined structure of the first structural part 12 and the second structural part 14a, 14b, the tolerance of the ink transfer (that is, the formation of the ink decoration layer 16) can be increased (for example, allowing the transfer accuracy to decrease, increasing the usable ink material range, etc.), and the production cost can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-shot moulding part structure, comprising:
a first structural part, the first structural part having a first area surface, a second area surface, a joining surface located on the second area surface, and a bottom surface opposite to the first area surface or the second area surface, the joining surface and the second area surface being non-parallel, the first structural part comprising a recessed structure located on the second area surface, a side surface of the recessed structure being used as the joining surface, the recessed structure adjoining the bottom surface;
an ink decoration layer, the ink decoration layer being spread on the first area surface and the second area surface and not on the joining surface; and
a second structural part, the second structural part being combined with the first structural part and covering the second area surface, the second structural part touching the joining surface and the bottom surface.

2. The multi-shot moulding part structure according to claim 1, wherein the recessed structure is a recess or a through hole.

3. The multi-shot moulding part structure according to claim 1, wherein the recessed structure is located at an outer edge of the first structural part.

4. The multi-shot moulding part structure according to claim 3, wherein the recessed structure has a decreasing width in an extension direction, and the extension direction points from the outer edge to an inner side of the first structural part and is parallel to the second area surface.

5. The multi-shot moulding part structure according to claim 3, wherein the recessed structure has a trapezoidal cross section in an extension direction, and the extension direction points from the outer edge to an inner side of the first structural part and is parallel to the second area surface.

6. The multi-shot moulding part structure according to claim 1, wherein the first structural part comprises a plurality of the recessed structures, arranged in a row on the second area surface in an arrangement direction, the first or last of the plurality of the recessed structures in the arrangement direction is located at an outer edge of the first structural part.

7. The multi-shot moulding part structure according to claim 1, wherein the first structural part and the second structural part are different in material.

8. The multi-shot moulding part structure according to claim 1, wherein the first area surface and the second area surface are two surfaces of different heights in a step structure.

* * * * *